US012539900B2

(12) United States Patent
Bulawa et al.

(10) Patent No.: US 12,539,900 B2
(45) Date of Patent: Feb. 3, 2026

(54) TRACK SENSOR ARRANGEMENT

(71) Applicant: voestalpine Signaling Poland Sp. z o. o., Sopot (PL)

(72) Inventors: Mariusz Buława, Sopot (PL); Jarosław Stec, Gdynia (PL)

(73) Assignee: VOESTALPINE SIGNALING POLAND SP. Z O. O., Sopot (PL)

( * ) Notice: Subject to any disclaimer, the term of this patent is extended or adjusted under 35 U.S.C. 154(b) by 739 days.

(21) Appl. No.: 17/930,759

(22) Filed: Sep. 9, 2022

(65) Prior Publication Data

US 2023/0084852 A1 Mar. 16, 2023

(30) Foreign Application Priority Data

Sep. 10, 2021 (PL) ........................................ 438929

(51) Int. Cl.

*B61L 1/02* (2006.01)
*B61L 25/02* (2006.01)
*H01R 13/631* (2006.01)
*H01R 13/639* (2006.01)

(52) U.S. Cl.

CPC ................ *B61L 1/02* (2013.01); *B61L 25/02* (2013.01); *H01R 13/631* (2013.01); *H01R 13/639* (2013.01); *H01R 2201/20* (2013.01)

(58) Field of Classification Search

CPC .. B61L 25/02; B61L 1/02; B61L 1/163; B61L 1/165; B61L 1/14; H01R 13/631; H01R 13/639; H01R 2201/20

See application file for complete search history.

(56) References Cited

U.S. PATENT DOCUMENTS 5,462,244 A * 10/1995 Van Der Hoek ......... B61L 1/06 246/246
5,628,479 A * 5/1997 Ballinger ................ B61L 1/165 324/179
7,216,558 B2 * 5/2007 Kumar ...................... B61L 1/02 73/866.5

(Continued)

FOREIGN PATENT DOCUMENTS

CN 109398423 A * 3/2019 .............. B61L 25/02
CN 110316225 A * 10/2019 ................ B61L 1/16

(Continued)

OTHER PUBLICATIONS

Polish Search Report issued May 11, 2022 in connection with Polish Patent Application No. P. 438929.

(Continued)

*Primary Examiner* — Cheng Lin
(74) *Attorney, Agent, or Firm* — Gary J. Gershik

(57) ABSTRACT

A track sensor arrangement consists of a wheel sensor (1), a detachable connection assembly (2) and a track holder (3). The detachable connection assembly (2) consists of a supply cable (4) and a plug (5) provided with an electric plug connection (6B). The track holder (3) consists of a support (7) and of connection elements (8). Inside the body (9) of the plug (5) an assembly compartment (10) is formed. The body (9) of the plug (5) is slidingly fitted on the support (7), wherein on the body (9) of the plug (5) a mounting clamp (11) is slidingly fitted. The mounting clamp (11) is fastened to the support (7) by means of a screw connection (12).

20 Claims, 6 Drawing Sheets

(56) References Cited

U.S. PATENT DOCUMENTS

| | | | | |
|---|---|---|---|---|
| 2021/0347395 | A1* | 11/2021 | Buchinger | B61L 1/08 |

FOREIGN PATENT DOCUMENTS

| | | | | | |
|---|---|---|---|---|---|
| DE | 102017103243 | B3 | * | 2/2018 | E01B 26/00 |
| EP | 1808531 | A1 | * | 7/2007 | E01B 26/00 |
| EP | 3567161 | A1 | * | 11/2019 | B61L 1/02 |
| EP | 3 567 161 | B1 | | 4/2021 | |
| PL | 1808531 | | | 6/2009 | |
| PL | 2332803 | | | 9/2017 | |
| PL | 234683 | B1 | | 3/2020 | |
| PL | 3620346 | | | 7/2021 | |

OTHER PUBLICATIONS

European Search Report issued Jan. 30, 2023 in connection with European Application No. EP 22 19 3889.

* cited by examiner

TRACK SENSOR ARRANGEMENT

CROSS-REFERENCE TO RELATED APPLICATIONS

This application claims the priority of Polish Patent Application No. P.438929 filed Sep. 10, 2021 the contents of which is hereby incorporated herein by reference into the subject application.

FIELD OF THE INVENTION

The subject of the invention is an arrangement of a track sensor intended for monitoring the movement of rail vehicles.

BACKGROUND OF THE INVENTION

According to the disclosure of PL234683 B1 a plug for installation of cable connectors of track sensors is known. The plug consists of a through-body with an internal assembly compartment, with a plug socket. The body which is provided with a base is installed on a support in the form of a centering element formed as an angled profile made of a load-bearing plate and an adjusting plate perpendicular to the load-bearing plate. The load-bearing plate is provided with resting guides, on which overlay guides of the base formed on the body of the plug are slidingly mounted. The plug is screwed to the support angled profile which is part of the clamp mounted on the rail. A cable is attached to the plug. Inside the body of the plug an assembly compartment is formed.

In FIG. 10 of the above-mentioned patent specification a track sensor arrangement is shown. This arrangement consists of a wheel sensor, a detachable connection assembly and a track clamp. The detachable connection assembly consists of a power cable and a plug provided with an electric plug connection. The track clamp consists of a support and of connection elements.

SUMMARY OF THE INVENTION

Provided herein is an arrangement of a track sensor intended for monitoring the movement of rail vehicles.

In an embodiment, the track sensor arrangement consists of a wheel sensor (1), a detachable connection assembly (2) and a track clamp (3), wherein the detachable connection assembly (2) consists of a supply cable (4) and a plug (5) provided with an electric plug connection (6B), whereas the track clamp (3) consists of a support (7) and of connection elements (8), wherein inside the body (9) of the plug (5) an assembly compartment (10) is formed, and the body (9) of the plug (5) is slidingly fitted on the support (7), characterized in that on the body (9) of the plug (5) a mounting holder (11) is slidingly fitted, wherein the mounting holder (11) is fastened to the support (7) by means of a screw connection (12).

DETAILED DESCRIPTION

Figure 1:
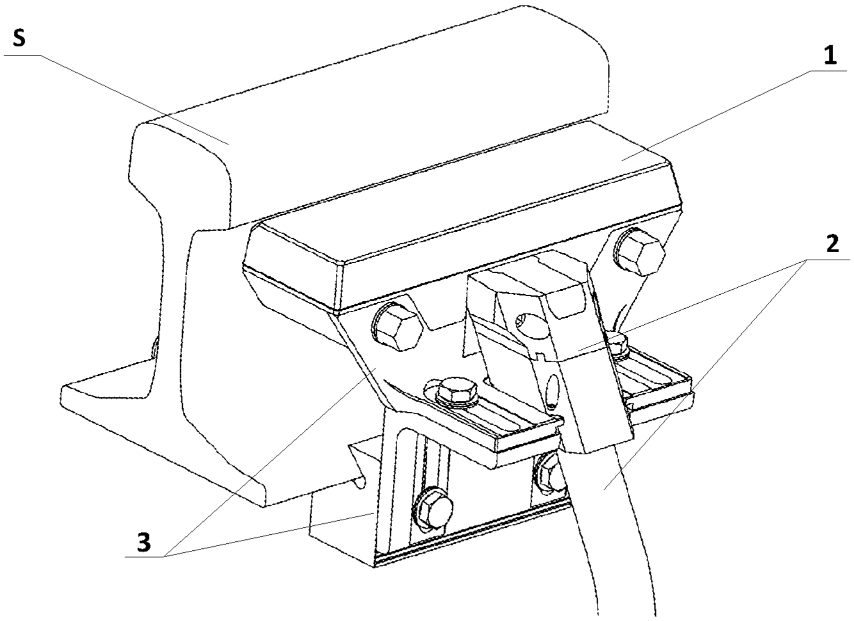
FIG. 1 presents an overall view of a track sensor arrangement.

A track sensor arrangement consisting of a wheel sensor, a detachable connection assembly and a track clamp, wherein the detachable connection assembly consists of a supply cable and a plug provided with an electric plug connection, and the track clamp consists of a support and of connection elements, and inside the body of the plug an assembly compartment is formed, and the body of the plug is slidingly fitted on the support, is according to the invention characterized in that on the body of the plug a mounting holder is slidingly fitted, wherein the mounting holder is fastened to the support by means of a screw connection.

In a first variant of the invention, the mounting holder is preferably seated on the body above first guides which are formed on the body of the plug, wherein the first guides are seated in second guides which are formed on the support.

In a second variant of the invention, preferably, the support is used as a one of the connection elements in the track clamp.

Furthermore, in the second variant of the invention, preferably, the mounting holder is fitted on pin guides which are fixed on the support, and on through guides which are formed in the body of the plug.

In the first and second variant of the invention, preferably, the mounting holder is connected to the body of the plug by means of a double-sided snap-fit connection.

In the first and second variant of the invention, preferably, at least one elastic element is arranged between the body of the plug and the mounting holder.

In the first and second variant of the invention, preferably, a narrowing is formed between wings of the mounting holder.

In the first and second variant of the invention, preferably, in the detachable connection assembly a through hole is formed, and in the support a concentric recess is formed, in which a seal or an access authorization screw is embedded.

In the first and second variant of the invention, preferably, on the mounting holder a tag field is delimited, on which a RFID identifier is mounted.

In the second variant of the invention, preferably, in the body of the plug a socket is formed, in which an elastic protective cover of the electric plug connection is situated.

In the second variant of the invention, preferably, on the support a roughened manipulation field is formed that facilitates the assembly of the connection elements.

In the first variant of the invention, preferably, the track clamp is intended for attaching the sensor arrangement to a rail.

In the second variant of the invention, preferably, the track clamp is intended for attaching the sensor arrangement to a railway sleeper.

The solution according to the invention is durable in operation and ensures reliability of the connection between the wheel sensor and receiving devices. The track sensor arrangement allows for easy and safe maintenance work. In case the supply cable is torn off, the mounting holder is damaged first, which means that the electric connectors of the wheel sensor will not be damaged or destroyed. In the context of the present invention, the term "supply cable" is to be understood as a cable providing electrical power to the wheel sensor as well as a cable providing signaling.

The invention is explained in more details in exemplary embodiments below and in the drawing provided, including in axonometric views.

Example 1

As presented in FIG. 1, the first variant of the track sensor arrangement consists of three substantial parts: a wheel sensor 1, a detachable connection assembly 2 and a track clamp 3 intended for attaching the sensor arrangement directly to a rail S.

Figure 2:
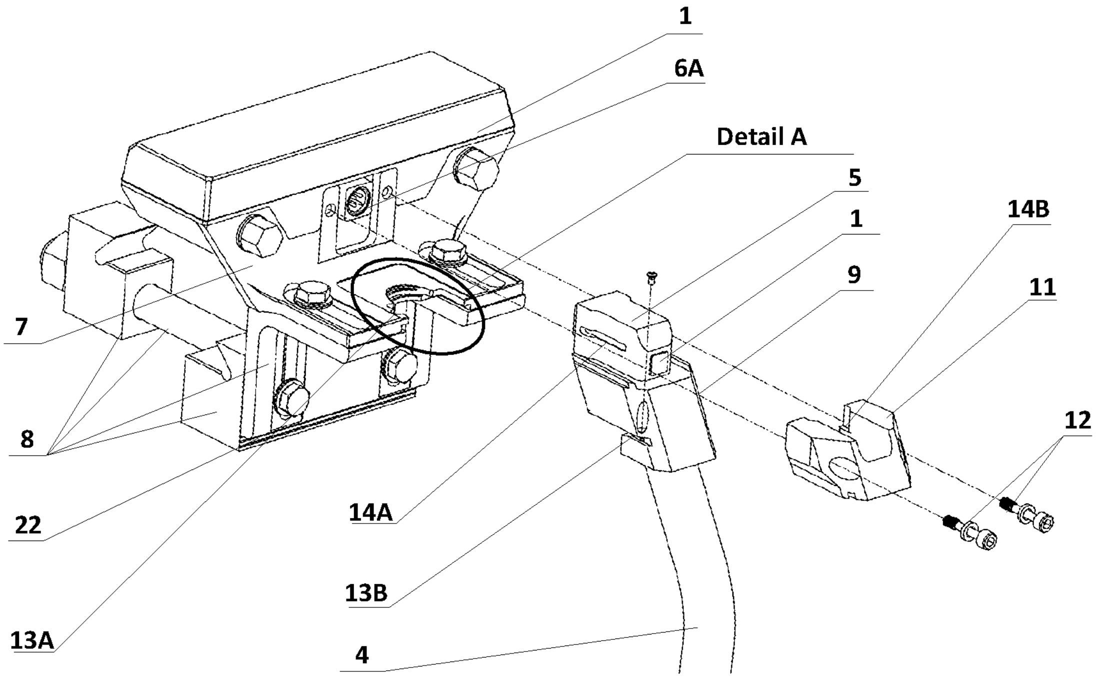
FIG. 2 presents a view of the track sensor arrangement separated into basic components.
Figure 3:
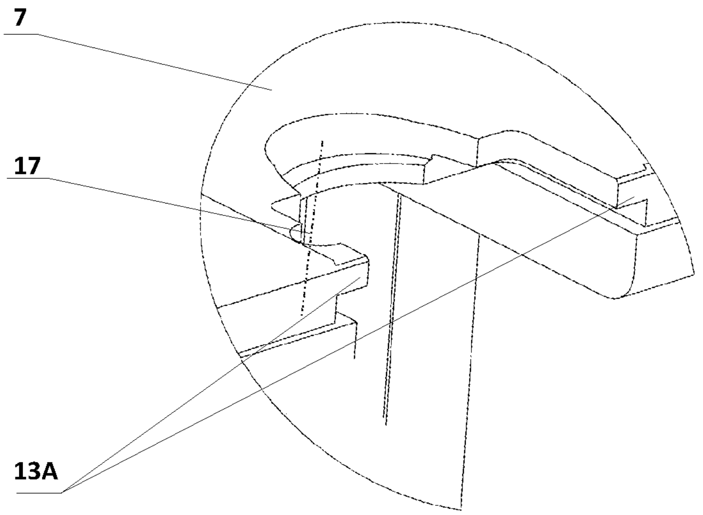
FIG. 3 presents detail A of FIG. 2.
Figure 4:
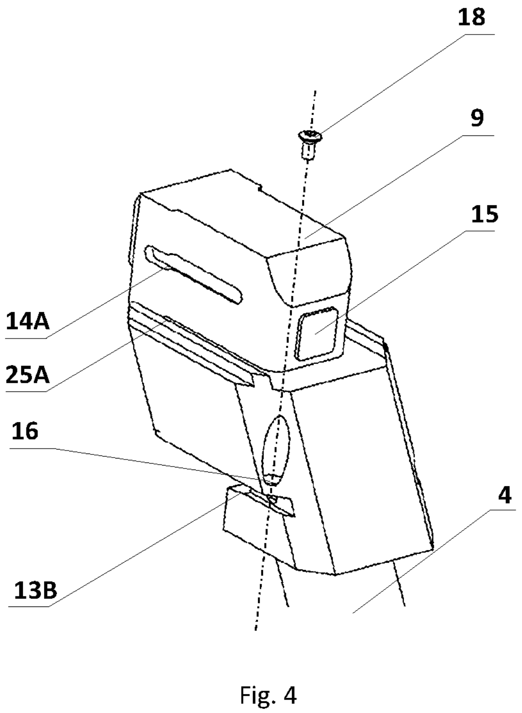
FIG. 4 presents a view of a body of a plug.
Figure 5:
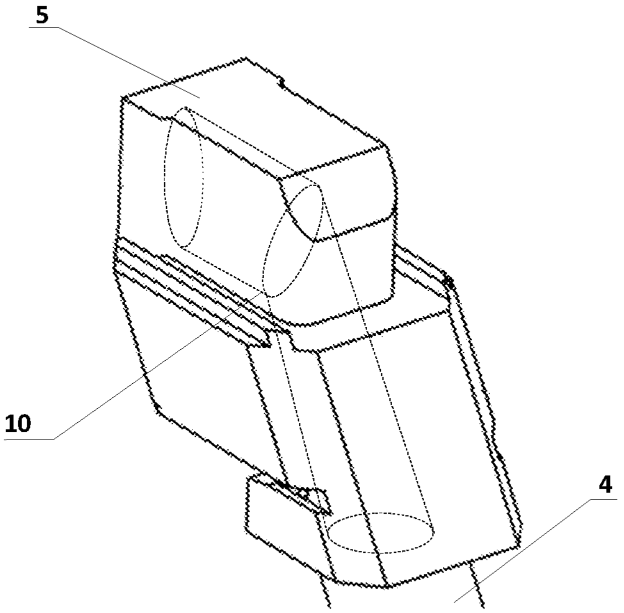
FIG. 5 presents a view of the body of the plug with indicated assembly compartment.
Figure 6:
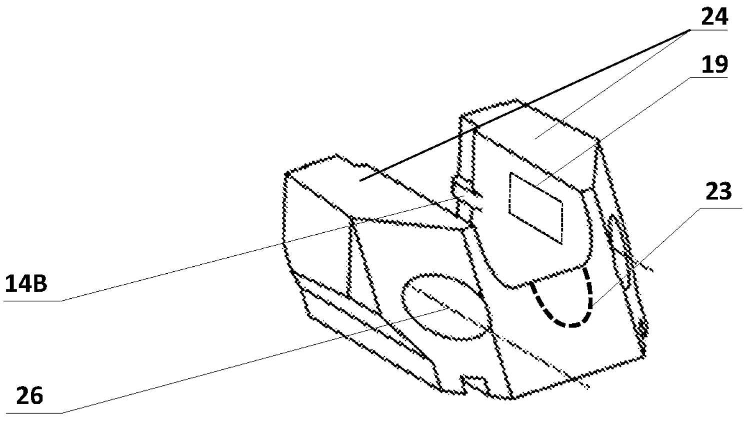
FIG. 6 presents a view of a mounting holder.

As presented in FIG. 2, the detachable connection assembly 2 consists of a supply cable 4 and a plug 5 provided with an electric plug connection 6B, whereas the track clamp 3 consists of a support 7 and of connection elements 8. Inside a body 9 of the plug 5 an assembly compartment 10 is formed, and the body 9 of the plug 5 is slidingly fitted on the support 7. On the body 9 of the plug 5 a mounting holder 11 is slidingly fitted, wherein the mounting holder 11 is fastened to the support 7 by means of a screw connection 12. The mounting holder 11 is located on the body 9 above guides 13B which are situated on the body 9 of the plug 5.

The mounting holder 11 is connected to the body 9 of the plug 5 also by means of a double-sided snap-fit connection 14A,14B.

On the support 7 a roughened manipulation area 22 is formed.

The detachable connection assembly 2 is connected to a wheel sensor 1 by means of electric plug connections 6A,6B.

Example 2

The track sensor arrangement is constructed as in example 1, except that, as presented in FIG. 2, between the body 9 of the plug 5 and the mounting holder 11 an elastic element 15 is arranged. A narrowing 23 is formed between two wings 24 of the mounting holder 11, which narrowing 23 is damaged first in case when the wheel sensor 1 is in danger of being damaged.

In the detachable connection assembly 2 a through hole 16 is formed, and in the support 7 a concentric recess 17 is formed, in which an access authorization screw 18 or alternatively a seal is embedded.

On the mounting holder 11 an indication field 9 is delimited, on the surface of which a RFID identifier is fitted.

Example 3

Figure 7:
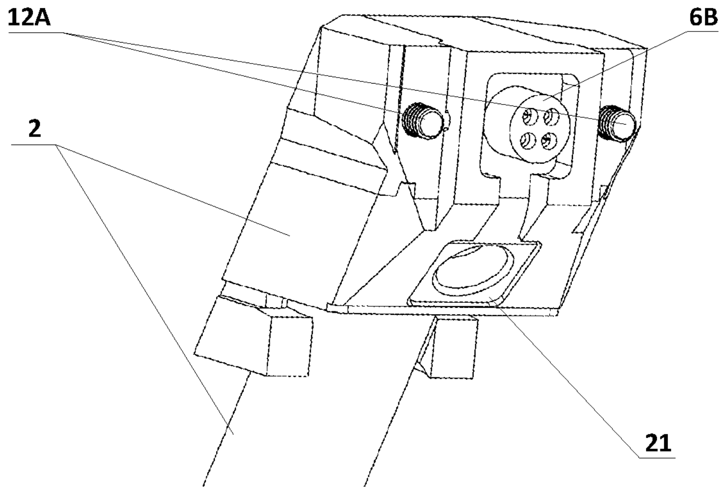
FIG. 7 presents a view of a front part of the plug where a protective cover is open.
Figure 8:
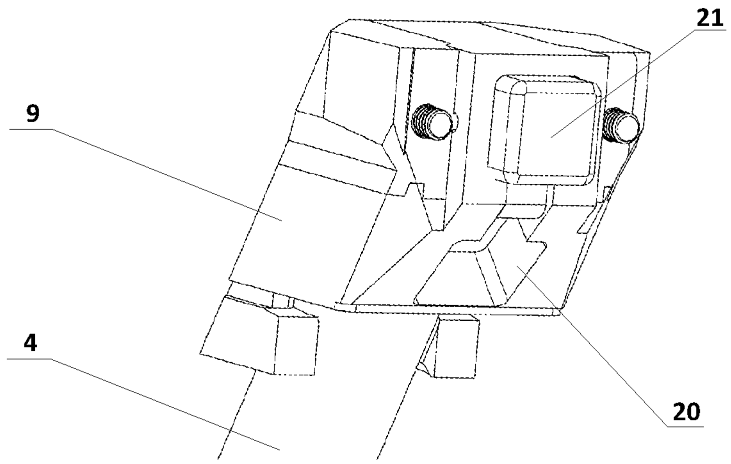
FIG. 8 the protective cover is closed.

The track sensor arrangement is constructed as in example 2, except that, as presented in FIG. 7 and FIG. 8, in the body 9 of the plug 5 a socket 20 is formed, in which an elastic protective cover 21 of the electric plug connection 6B is situated.

Example 4

Figure 9:
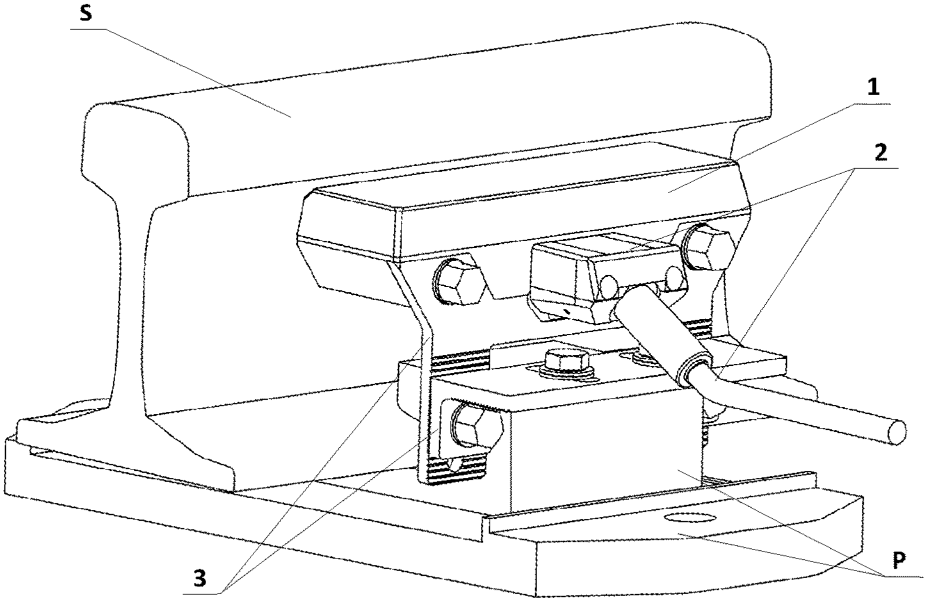
FIG. 9 presents an overall view of a second variant of the track sensor arrangement.
Figure 10:
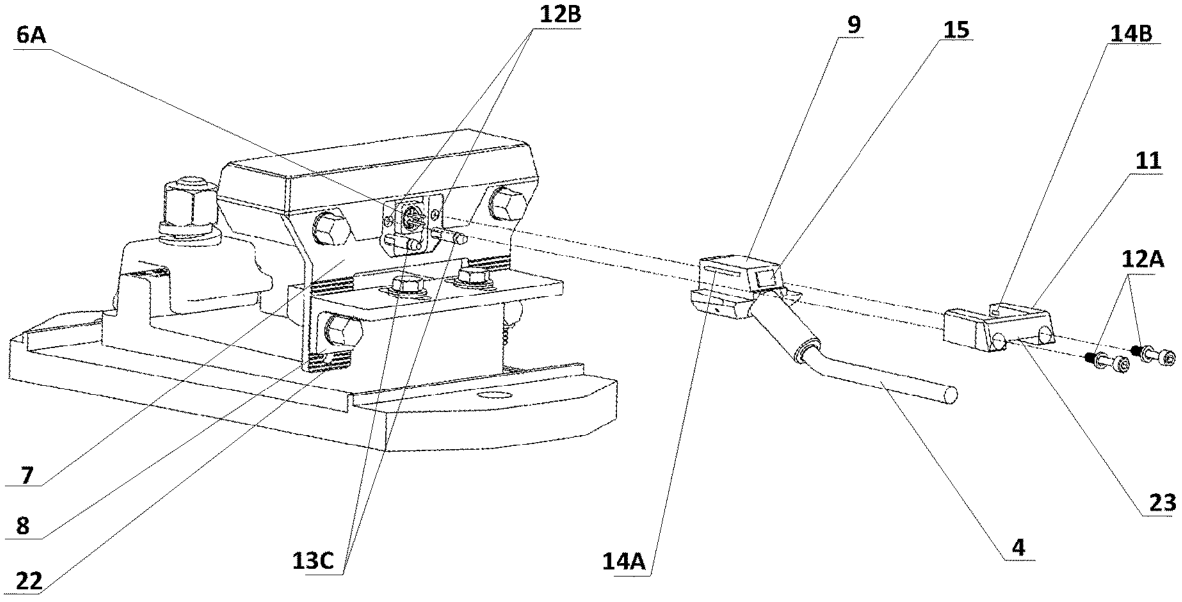
FIG. 10 presents a view of the second variant of the track sensor arrangement separated into basic components.
Figure 11:
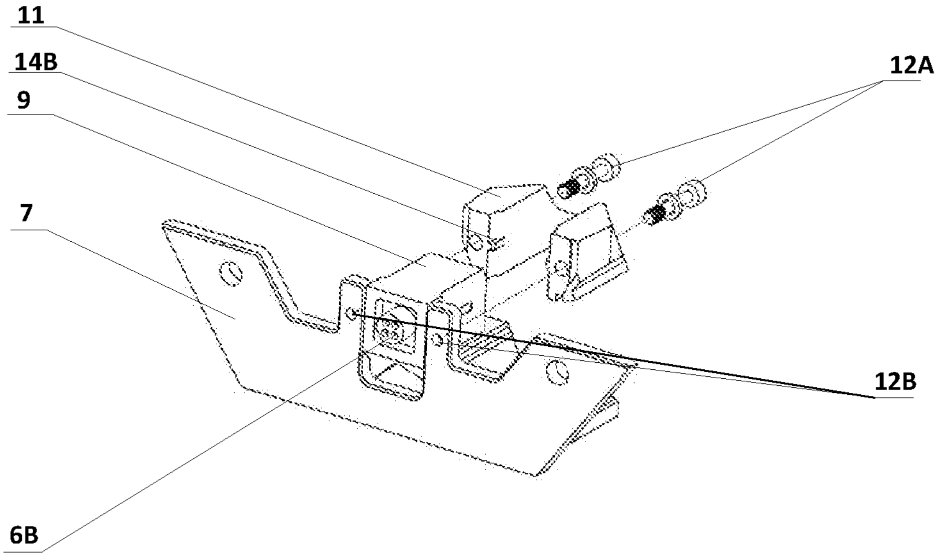
FIG. 11 presents a view of the seated plug on the support in a first variant of the arrangement.

As presented in FIG. 9, the second variant of the track sensor arrangement consists of three substantial parts: a wheel sensor 1, a detachable connection assembly 2 and a track clamp 3 intended for attaching the sensor arrangement to a railway sleeper P.

The detachable connection assembly 2 consists of a supply cable 4 and of a plug 5 provided with an electric plug connection 6B. The track clamp 3 consists of a support 7 serving also as one of connecting elements 8.

Figure 12:
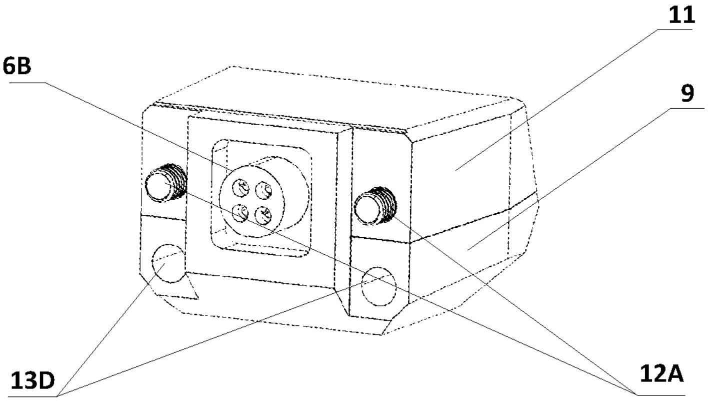
FIG. 12 presents a view of the plug in the second variant of the arrangement.

The body 9 of the plug 5 is slidingly fitted on the support 7. On the body 9 of the plug 5 a mounting holder 11 is slidingly fitted, wherein the body 9 is fitted on pin guides 13C which are fixed on the support 7, and on through guides 13D which are formed in the body 9 of the plug 5. As presented in FIG. 12, the mounting holder 11 is provided with a screw connection 12A for attachment on the support 7.

The mounting holder 11 is also connected to the body 9 of the plug 5 by means of a double-sided snap-fit connection 14A,14B. Between the body 9 of the plug 5 and the mounting holder 11 one elastic element 15 is arranged. A narrowing 23 is formed between two wings 24 of the mounting holder 11.

On the support 7 a roughened manipulation area 22 is formed that facilitates the assembly of the connection elements 8.

What is claimed is:

1. A track sensor arrangement consisting of a wheel sensor (1), a detachable connection assembly (2) and a track clamp (3), wherein the detachable connection assembly (2) consists of a supply cable (4) and a plug (5) provided with an electric plug connection (6B), whereas the track clamp (3) consists of a support (7) and of connection elements (8), wherein inside the body (9) of the plug (5) an assembly compartment (10) is formed, and the body (9) of the plug (5) is slidingly seated on the support (7) and externally accessible, characterized in that on the body (9) of the plug (5) a detachable mounting holder (11) is slidingly seated, wherein the mounting holder (11) is fastened to the support (7) by means of a screw connection (12).

2. The sensor arrangement according to claim 1 characterized in that the mounting holder (11) is seated on the body (9) above first guides (13B) which are formed on the body (9) of the plug (5), wherein the first guides (13B) are seated in second guides (13A) which are formed on the support (7).

3. The sensor arrangement according to claim 2 characterized in that in the body (9) of the plug (5) a socket (20) is formed, in which an elastic protective cover (21) of the electric plug connection (6B) is situated.

4. The sensor arrangement according to claim 3 characterized in that a roughened manipulation area (22) is formed on the support (7), or characterized in that the track clamp (3) is intended for attaching the sensor arrangement (1) to a rail (S).

5. The sensor arrangement according to claim 1 characterized in that the support (7) is used as one of the connection elements (8) in the track clamp (3).

6. The sensor arrangement according to claim 5 characterized in that the body (9) of the plug (5) is seated on pin guides (13C) which are fixed on the support (7), and in through guides (13D) which are formed in the body (9) of the plug (5).

7. The sensor arrangement according to claim 6 characterized in that the mounting holder (11) is connected to the body (9) of the plug (5) by means of a double-sided snap-fit connection (14A, 14B).

8. The sensor arrangement according to claim 7 characterized in that at least one elastic element (15) is arranged between the body (9) of the plug (5) and the mounting holder (11).

9. The sensor arrangement according to claim 8 characterized in that a narrowing (23) is formed between wings (24) of the mounting holder (11).

10. The sensor arrangement according to claim 9 characterized in that in the detachable connection assembly (2) a through hole (16) is formed, and in the support (7) a concentric recess (17) is formed, in which a seal or an access authorization screw (18) is embedded.

11. The sensor arrangement according to claim 10 characterized in that on the mounting holder (11) a tag field (19) is delimited, on which a RFID identifier is mounted.

12. The sensor arrangement according to claim 1 characterized in that the mounting holder (11) is connected to the body (9) of the plug (5) by means of a double-sided snap-fit connection (14A, 14B).

13. The sensor arrangement according to claim 1 characterized in that at least one elastic element (15) is arranged between the body (9) of the plug (5) and the mounting holder (11).

14. The sensor arrangement according to claim 1 characterized in that a narrowing (23) is formed between wings (24) of the mounting holder (11).

15. The sensor arrangement according to claim 1 characterized in that in the detachable connection assembly (2) a through hole (16) is formed, and in the support (7) a concentric recess (17) is formed, in which a seal or an access authorization screw (18) is embedded.

16. The sensor arrangement according to claim 1 characterized in that on the mounting holder (11) a tag field (19) is delimited, on which a RFID identifier is mounted.

17. The sensor arrangement according to claim 1 characterized in that in the body (9) of the plug (5) a socket (20) is formed, in which an elastic protective cover (21) of the electric plug connection (6B) is situated.

18. The sensor arrangement according to claim 1 characterized in that a roughened manipulation area (22) is formed on the support (7).

19. The sensor arrangement according to claim 1 characterized in that the track clamp (3) is intended for attaching the sensor arrangement (1) to a rail (S).

20. The sensor arrangement according to claim 1 characterized in that the track clamp (3) is intended for attaching the sensor arrangement (1) to a railway sleeper (P).

* * * * *